May 31, 1927.
A. G. OGDEN
1,630,539
NEGATIVE MAKING DEVICE
Filed April 22, 1926
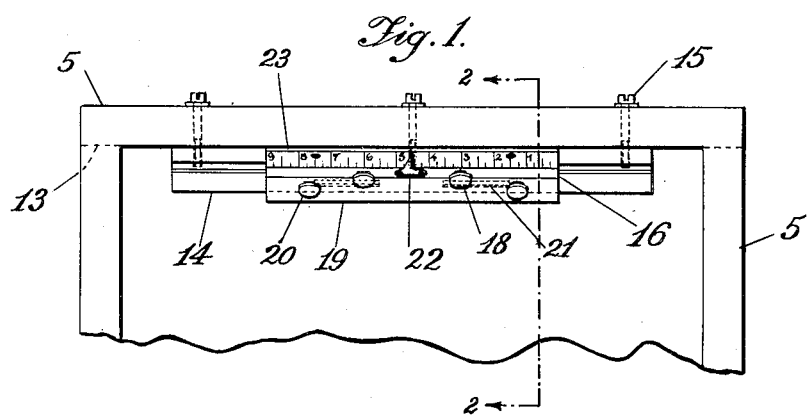
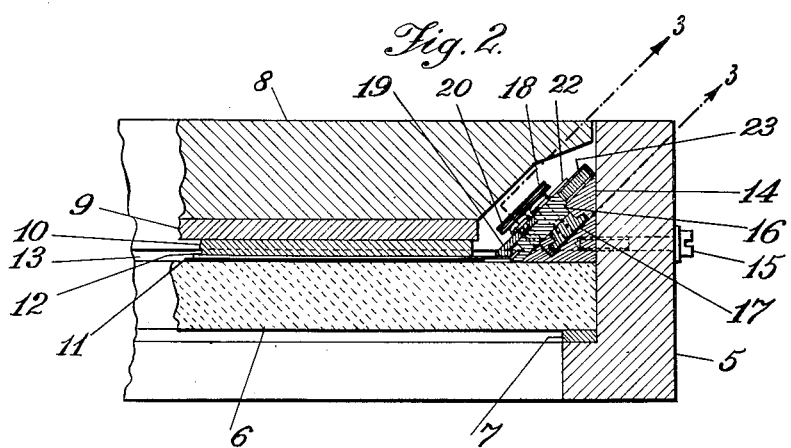
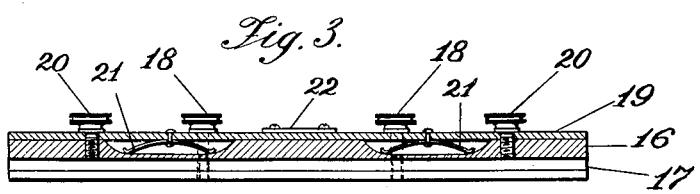
INVENTOR
Ashley G. Ogden
BY
Sydney Prescott
ATTORNEY Patented May 31, 1927.

1,630,539

UNITED STATES PATENT OFFICE.

ASHLEY G. OGDEN, OF BALTIMORE, MARYLAND, ASSIGNOR TO AMERICAN MACHINE & FOUNDRY COMPANY, A CORPORATION OF NEW JERSEY.

NEGATIVE-MAKING DEVICE.

Application filed April 22, 1926. Serial No. 103,762.

This invention relates to an improvement in a negative making device.

The main object of the present invention is the production of a device for making on one film a plurality of accurately registered negatives of a small original. A further object of the invention is the production of an attachment to a regular photographic exposure frame, such as the Eastman Monolock frame, in order that the said frame and attachment may be employed for this purpose. With these and other objects not specifically mentioned in view, the invention consists in certain constructions and combinations of elements which will be hereinafter fully described and then specifically set forth in the claims hereunto appended.

In the accompanying drawings, in which like characters of reference indicate the same or like parts, Fig. 1 is a plan view of a device constructed in accordance with the invention; Fig. 2 is a lateral cross-section through the frame and register, taken on the line 2—2 in Fig. 1; and Fig. 3 is a longitudinal cross-section through the register, taken on the line 3—3 in Fig. 2, showing details of the adjusting and sliding arrangement.

In carrying the invention into effect, there is provided means for holding the original to be copied, means for holding the film on which a plurality of negatives are to be made, said holding means being relatively movable in order to permit relative shifting to successive positions for successive exposures, means for accurately indicating successive relative positions of said original and said film, and means whereby said original and said film are locked in successive positions for successive exposures. These various means may be varied in construction within the scope of the claims, for the specific device selected to illustrate the invention is but one of numerous possible concrete embodiments of the same. The invention, therefore, is not to be restricted to the precise details of the structure shown and described.

Referring to the drawings: The registering attachment is shown in combination with a standard Eastman Monolock frame 5 having a glass bottom 6 resting on felt strips 7, the cover 8 hinged to the frame 5, the felt lining 9, and the loose felt packing 10.

The original, marked 11, is placed in the centre of the frame 5 and attached by adhesive strips to the glass bottom 6. The negative film 12 is fastened to the movable part of the registering device and is thereby made movable over the original, slots 13 being cut in the side of the frame 5 to permit the ends of the film to pass out of the frame when slid to the extreme position on either side.

The registering attachment consists of the triangular guideway 14 which is fastened by screws in the angle formed by the glass bottom 6 and one side of the frame 5, and of the slide 16 to which the film is attached for registering and which is adjustably secured in the guideway 14. The slide 16 has the clamp shoe 17 fitting an undercut slot extending along the entire length of the guideway 14 and fastened to the slide by the clamp screws 18 by which the slide 16 can be locked in any position along the slot. The plate 19 clamps the edge of the film 12 against the slide 16 by means of the screws 20. Springs 21, lying in grooves made for this purpose in the slide, press against the plate 19 and lift it when the screws 20 are released for insertion of the film. To the slide 16 is attached the position indicator 22 accurately showing, on the stationary position scale 23, fastened to the guideway 14, the position of the slide as the latter is being manually adjusted.

To make a set of duplicate negatives by means of this device, after having computed the possible number of prints of the original upon the negative film and the distances between the centres of these positions, and upon having covered the entire glass bottom around the original with opaque material, and secured the edge of the film to the slide by means of the screws 20, it is only necessary to release the screws 18 and to move the slide into the first position as indicated by the position indicator 22 on the scale 23, then lock the slide by tightening the screws 18, then make the exposure, then loosen the screws 18 and move the slide to the second indicated position, and so on until the entire width of the film has been moved across the original and successively exposed.

What is claimed is:

1. A device for making on one film a plurality of accurately registered negatives of a small original, comprising a photographic exposure frame having a glass bottom to which the original is secured, a guideway formed along one side of the frame, a slide carrying the film and movable in said guideway, means for accurately indicating successive relative positions of said original and said slide, and means whereby said slide is locked in successive positions for successive exposures.

2. A device for making on one film a plurality of accurately registered negatives of a small original, comprising a photographic exposure frame having a glass bottom to which the original is secured, a guideway formed along one side of said frame, a slide carrying the film and movable in said guideway and carrying a position indicator, a stationary position scale alongside said slide coacting with said indicator, and means whereby said slide is locked in successive positions for successive exposures.

3. A device for making on one film a plurality of accurately registered negatives of a small original, comprising a photographic exposure frame having a glass bottom to which the original is secured, an angular guideway secured to one side of said frame, a slide movable in said guideway and carrying a position indicator, a film clamp carried by said slide, and means for locking said slide in successive positions for successive exposures.

4. A device for making on one film a plurality of accurately registered negatives of a small original, comprising a photographic exposure frame having a glass bottom to which the original is secured, an angular guideway secured to one side of said frame, a slide movable in said guideway and carrying a position indicator, a film clamp carried by said slide, and a screw-actuated clamping device for said slide to lock it in successive positions for successive exposures.

In testimony whereof, I have signed my name to this specification.

ASHLEY G. OGDEN.